United States Patent
Luo et al.

(10) Patent No.: US 9,791,125 B2
(45) Date of Patent: Oct. 17, 2017

(54) LENS AND ILLUMINATION DEVICE COMPRISING THE LENS

(71) Applicant: Osram GmbH, Munich (DE)

(72) Inventors: Yabin Luo, Shenzhen Guangdong (CN); Yuan Lu, Shenzhen Guangdong (CN); Canbang Yang, Shenzhen Guangdong (CN); Zouya Huang, Shenzhen Guangdong (CN)

(73) Assignee: OSRAM GmbH, Munich (DE)

( * ) Notice: Subject to any disclaimer, the term of this patent is extended or adjusted under 35 U.S.C. 154(b) by 339 days.

(21) Appl. No.: 14/387,247

(22) PCT Filed: Mar. 25, 2013

(86) PCT No.: PCT/EP2013/056192
§ 371 (c)(1),
(2) Date: Sep. 23, 2014

(87) PCT Pub. No.: WO2013/144050
PCT Pub. Date: Oct. 3, 2013

(65) Prior Publication Data
US 2015/0117000 A1 Apr. 30, 2015

(30) Foreign Application Priority Data
Mar. 28, 2012 (CN) ............... 2012 2 0126714 U

(51) Int. Cl.
*F21V 5/04* (2006.01)
*F21V 29/00* (2015.01)
(Continued)

(52) U.S. Cl.
CPC ............ *F21V 5/04* (2013.01); *F21V 5/002* (2013.01); *F21V 7/0091* (2013.01);
(Continued)

(58) Field of Classification Search
CPC ................. F21V 5/04; F21V 7/048
(Continued)

(56) References Cited

U.S. PATENT DOCUMENTS

| 8,235,549 B2* | 8/2012 | Gingrich, III | F21V 19/045 |
| | | | 362/249.02 |
| 9,291,327 B2* | 3/2016 | Rodriguez | F21V 29/02 |

(Continued)

FOREIGN PATENT DOCUMENTS

| DE | 202011050024 U1 | 9/2011 | |
| EP | 2119955 A1 | 11/2009 | |
| FR | WO 03044870 A1 * | 5/2003 | .............. F21S 8/086 |
| WO | 03044870 A1 | 5/2003 | |
| WO | 2007142947 A2 | 12/2007 | |

OTHER PUBLICATIONS

International Search Report for PCT/EP2013/056192 dated Jun. 10, 2013 and Written Opinion received Jun. 2013.

*Primary Examiner* — Andrew Coughlin
*Assistant Examiner* — Christopher E Dunay
(74) *Attorney, Agent, or Firm* — Viering, Jentschura & Partner mbB

(57) ABSTRACT

Various embodiments may relate to a lens for an illumination device. The lens includes a bottom wall, a top wall, and a circumferential wall. The circumferential wall connects the bottom wall and the top wall. A plurality of regions of the bottom wall respectively arch towards the top wall to define at least one first accommodation cavity having an inner wall as a first incident surface, and at least one second accommodation cavity having an inner wall as a second incident surface. The first and second incident surfaces are designed as different curved surfaces for receiving first incident light and second incident light, respectively. Various embodiments further relate to an illumination device including the lens.

14 Claims, 2 Drawing Sheets

(51) Int. Cl.
*F21V 5/00* (2015.01)
*F21V 7/00* (2006.01)
*G02B 19/00* (2006.01)
*F21V 29/74* (2015.01)
*F21V 29/70* (2015.01)
*F21V 23/00* (2015.01)
*F21Y 115/10* (2016.01)
*F21Y 113/10* (2016.01)
*F21Y 113/13* (2016.01)

(52) U.S. Cl.
CPC .......... *F21V 23/005* (2013.01); *F21V 29/004* (2013.01); *F21V 29/70* (2015.01); *F21V 29/74* (2015.01); *G02B 19/0028* (2013.01); *G02B 19/0066* (2013.01); *F21Y 2113/10* (2016.08); *F21Y 2113/13* (2016.08); *F21Y 2115/10* (2016.08)

(58) Field of Classification Search
USPC ............................................. 362/235, 249.02
See application file for complete search history.

(56) References Cited

U.S. PATENT DOCUMENTS

| | | | |
|---|---|---|---|
| 2005/0157515 A1* | 7/2005 | Chen .................. | H05B 33/0821 362/555 |
| 2005/0168987 A1 | 8/2005 | Tamaoki et al. | |
| 2006/0083016 A1 | 4/2006 | Okamura et al. | |
| 2009/0268455 A1* | 10/2009 | Allegri ...................... | F21K 9/00 362/235 |
| 2009/0296407 A1* | 12/2009 | Bailey ...................... | F21V 5/04 362/309 |
| 2012/0236565 A1* | 9/2012 | Wu ......................... | F21K 9/233 362/294 |
| 2012/0287630 A1* | 11/2012 | Ou ......................... | F21V 5/007 362/235 |
| 2013/0134456 A1* | 5/2013 | Lu ......................... | F21V 5/002 257/89 |
| 2013/0293148 A1* | 11/2013 | Holland .................... | F21V 5/04 315/297 |

* cited by examiner

LENS AND ILLUMINATION DEVICE COMPRISING THE LENS

RELATED APPLICATIONS

The present application is a national stage entry according to 35 U.S.C. §371 of PCT application No.: PCT/EP2013/056192 filed on Mar. 25, 2013, which claims priority from Chinese application No.: 201220126714.3 filed on Mar. 28, 2012, and is incorporated herein by reference in its entirety.

TECHNICAL FIELD

Various embodiments relate to a lens and an illumination device including the lens.

BACKGROUND

With the development of LED illumination techniques, more and more people use an LED illumination device as a light source for applications to various environments. As for an illumination device with a fixed light source, the characteristics of light emitted by the light source are generally set, for example, spectral power distribution, color temperature (CCT) and color rendering index (CRI), and so on. However, in many specific application environments such as hotels, malls, or residential buildings, it is often required to adjust the hue of the output light of the illumination device, especially the CCT, to change the lighting atmosphere according to the need or the mood of people, for example, the illumination device emits warm white light when a user spends his leisure time, and emits cool white light when a user studies and works.

In the existing illumination devices, the lens mounted in the illumination device only has an incident surface in a single shape, for receiving incident light emitted from light sources with different colors. These light sources with different colors have different color temperatures, and most of the incident light directly goes through the lens to emit scatteredly, which makes it impossible to deflect the optical path of the light emitted to the lens via the same incident surface in a desired direction, viz. it is impossible to make fine adjustment to the optical path. Thus, the color mixing effect cannot be improved via the lens, the system efficiency of the illumination device mounted with the lens is thereby limited, and more energy consumption is required for light adjustment and light mixing. For example, as shown in FIG. 1, when the illumination device 200 has a first light source in the center and two second light sources on both sides, respectively, first and second incident light respectively emitted from the first and second light sources enters the lens 100 via incident surfaces, as the incident surfaces have the same curved surface profile, it is impossible to make fine adjustment to the optical path of the incident light through the lens, and it is also difficult to mix light by means of the lens. The light emitted through the lens does not have an ideal color, and the obtained light distribution pattern has, for example, merely an elongated shape, rather than an ideal circular shape.

SUMMARY

Various embodiments provide a lens. The lens according to the present disclosure may be manufactured with a low cost, and is particularly applicable to an illumination device having multi-color light sources. The lens may achieve fine adjustment to the color of the mixed light of the multi-color light sources, improve the light mixing effect of the illumination device to obtain uniform light distribution, and improve the light efficiency.

Various embodiments provide a lens for an illumination device, the lens including a bottom wall, a top wall, and a circumferential wall, the circumferential wall connecting the bottom wall and the top wall, wherein, a plurality of regions of the bottom wall respectively arch towards the top wall to define at least one first accommodation cavity having an inner wall configured as a first incident surface, and at least one second accommodation cavity having an inner wall configured as a second incident surface, the first incident surface and the second incident surface being designed as different curved surfaces for receiving first incident light and second incident light, respectively. In various embodiment, "first and second incident light" indicates two or more kinds of incident light having different color temperatures, for example, multiple kinds of incident light having different colors that can be mixed into natural white light. By configuring the first and second incident surfaces for respectively receiving first and second incident light as curved surfaces having different profile, fine adjustment can be made to the color of the light obtained after primary mixing of the first incident light and the second incident light. In addition, the first and second incident light are mixed, which lays a good foundation for the final mixing of the first and second incident light through the lens, and light efficiency is further improved by adjusting the optical paths of the first and second incident light in the lens.

In various embodiments, the first incident surface is a symmetrical curved surface, and the second incident surface is an asymmetrical curved surface. The first incident surface configured as a symmetrical curved surface corresponds to the first incident light, and the second incident surface configured as an asymmetrical curved surface provides great design flexibility, so as to adjust different designs of the second incident surface according to the expected color of the light obtained by mixing the first and second incident light.

In various embodiments, the top wall is an emergent surface consisting of a micro-lens array. The first and second incident light adjusted via the first and second incident surfaces can be adjusted for a second time via the micro-lens array, which thereby further ensures the light mixing effect of the first and second incident light, and further improves the light distribution.

In various embodiments, the accommodation cavities are arranged to be separated from each other. That is, the bottom wall includes a connecting surface capable of connecting the first and second accommodation cavities or connecting two first accommodation cavities or two second accommodation cavities. The smaller the interval between the accommodation cavities is and the more the accommodation cavities are, the higher the possibility of fine adjustment is, the more uniform the pattern is, and the better the light mixing effect is.

According to various embodiments, the first incident surface is a rotationally symmetrical curved surface. Preferably, the first incident surface is a spherical surface. In this way, the first incident light can go through the first incident surface and emit uniformly and symmetrically towards, for example, the emergent surface configured as a micro-lens array.

In various embodiments, the second incident surface is a non-rotationally symmetrical curved surface, a vertex of the non-rotationally symmetrical curved surface, in a cross section, being located on a side, away from the first incident surface, of a midline of a projection of the second incident surface on a horizontal plane. The second incident light entering the lens through the second incident surface needs to be adjusted, and based on the design of non-rotational symmetry of the send incident surface, it is feasible to make the second incident light deflection towards the first incident surface as much as possible, so as to make fine adjustment to the second incident light. Thus, the first and second incident light having different colors can be well mixed within the lens, and the emergent light after mixing is made to concentratively emit towards the same region through the emergent surface of the lens, so as to enable the emergent light to have the desired color and obtain favorable light distribution. Preferably, the second incident surface is a free curved surface. Particularly preferably, the second incident surface has, in a cross section, a curve profile defined by the formula $y=-1E-08x^6+2E-06x^5-0.0001x^4+0.0032x^3-0.0633x^2+1.4584x+1E-06$.

According to various embodiments, the circumferential wall is configured as a total internal reflection surface having a free curved surface profile. The circumferential wall may receive incident light refracted via the incident surfaces, for example, the second incident surface, and reflect the incident light, so as to make further fine adjustment to the optical path of the incident light in the lens. The free curved surface of the circumferential wall may be defined by, for example, an appropriate higher-order equation.

According to various embodiments, the number of the second accommodation cavity is more than one, and the second accommodation cavities are uniformly arranged around the first accommodation cavity. For example, the lens includes one first accommodation cavity and two second accommodation cavities, the two second accommodation cavities are preferably symmetrically arranged on both sides of the first accommodation cavity, respectively; when the lens includes three or more second accommodation cavities, these second accommodation cavities may be arranged to uniformly surround the first accommodation cavity with the first accommodation cavity as the center. This design of symmetric arrangement of the first and second accommodation cavities helps to obtain uniform light distribution.

In various embodiments, the number of the first accommodation cavity is more than one, and the first accommodation cavities are arranged in an array in a central region of the bottom wall. When the lens includes a plurality of first accommodation cavities, these first accommodation cavities constitute an accommodation cavity array in the center to ensure that the first incident light can centrally and uniformly go through the lens and emit towards the object to be illuminated. The plurality of second accommodation cavities arranged to surround these first accommodation cavities cause the optical path of the second incident light in the lens to deflect towards the center, which thereby makes fine adjustment to the optical path of the second incident light, such that the optical path of the second incident light and the optical path of the first incident light converge in the lens, and ideal light mixing effect is thereby obtained, to finely adjust the color of the emergent light, to obtain, for example, cool white color or warm white color.

Various embodiments further provide an illumination device including the above lens. The illumination device has high light efficiency and uniform light distribution, and is capable of achieving superior light mixing effect with low energy consumption.

In various embodiments, the illumination device includes at least one first light source and at least one second light source, and further includes a lens as described above. The first and second light sources can provide first and second incident light having different colors, respectively. The incident light is preferably sufficiently mixed after being converged via the lens, and thereby, the emergent light which uniformly emits towards the object to be illuminated has the desired color.

In various embodiments, light emitted from the at least one first light source and light emitted from the at least one second light source have different color temperatures. The first and second light sources may provide the first incident light and the second incident light having different colors. The color temperature of the first incident light is, for example, 2700K, the color temperature of the second incident light is, for example, 6500K, and they can be mixed into natural white light.

In various embodiments, the illumination device further includes a circuit board carrying the first and second light sources, and a heat sink, wherein the first light source is accommodated in the first accommodation cavity of the lens, and the second light source is accommodated in the second accommodation cavity of the lens. For example, the lens and the circuit board can be directly fixed together using, for example, a fixing member, or mechanical connecting structures, with matched shapes, of the lens and the circuit board. In this preferred case, the first accommodation cavity is enclosed by the circuit board, and the first light source is correspondingly accommodated therein; and the second accommodation cavity is also enclosed by the circuit board, and the second light source is correspondingly accommodated therein.

According to various embodiments, the heat sink includes an accommodation portion for placing the lens and the circuit board. For the sake of compactness of the illumination device, the lens and the circuit board may be combined into one piece and placed in the heat sink. The heat sink may be designed, for example, into a cup shape or a ring shape, so as to surround or contact, in an area as large as possible, the member on the circuit board which generates heat at work, which thereby not only supports the circuit board, but also achieves superior heat transfer. When, for example, the light source is an LED chip, the illumination device is a retrofit lamp which may replace the conventional incandescent lamp.

According to various embodiments, the heat sink is configured as a circular structure having heat dissipating ribs on a circumferential wall, and the accommodation portion is arranged in the center of the heat sink. The cooling effect of the illumination device can be further improved by means of the heat dissipating ribs, to ensure the normal operation of the illumination device.

According to various embodiments, the circuit board includes control circuits controlling a working state of the first and second light sources, respectively. The person skilled in the art may design the control circuit based on the principle of switching circuit or PWM circuit. The on and off of the first and second light sources are controlled through the control circuit, and the intensity of the driving currents thereof is preferably controlled, which thereby may change the colors of the first and second light sources and achieve light adjusting effect.

The illumination device according to various embodiments has a simple structure and superior light adjusting effect, and may achieve uniform light distribution.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 2:
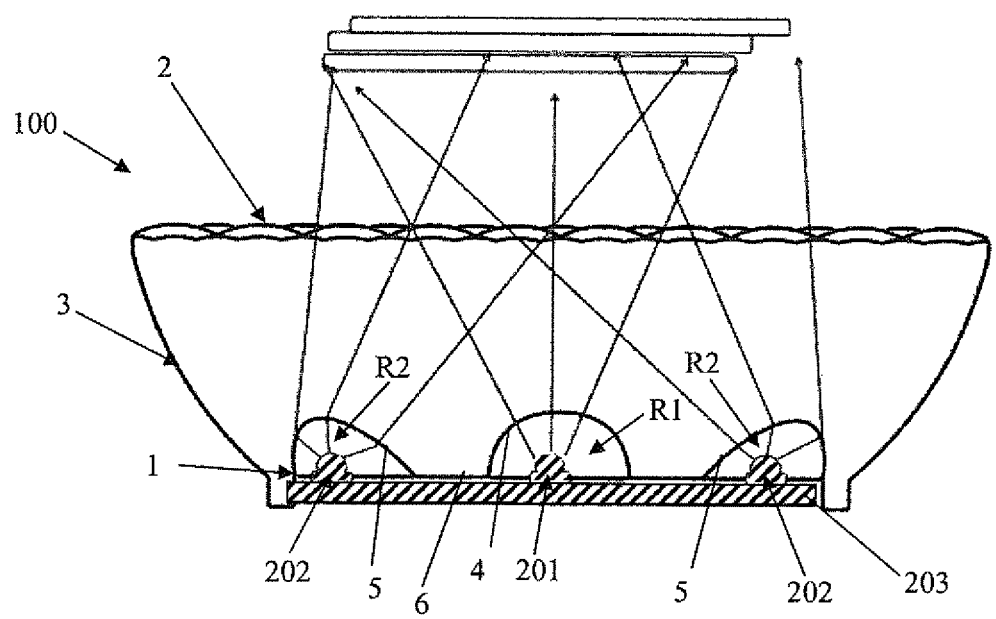
FIG. 2 is a sectional view of a lens according to an embodiment of the present disclosure.

FIG. 2 is a sectional view of a lens according to an embodiment of the present disclosure. The lens 100 for an illumination device 200 (see FIG. 3) includes a bottom wall 1, a top wall 2, and a circumferential wall 3. A plurality of regions of the bottom wall 1 respectively arch towards the top wall 2 to define at least one first accommodation cavity R1 and at least one second accommodation cavity R2, wherein an inner wall of the first accommodation cavity R1 is a first incident surface 4, and an inner wall of the second accommodation cavity R2 is a second incident surface 5. The first accommodation cavity R1 and the second accommodation cavity R2 can be either configured to be adjacent to each other, or configured to be separated from each other as shown in the present embodiment. A connecting surface 6 on the bottom wall 1 connects the first accommodation cavities R1 and the second accommodation cavities R2. In the present embodiment, the first and second incident surfaces 4, 5 receive first and second incident light having different colors, viz. having different color temperatures, respectively, for example, in order to make the emergent light through the lens become natural white light, the first incident light can be warm white light having the color temperature of 2700K, and the second incident light can be cool white light having the color temperature of 6500K. For the sake of clarity, the at least one first light source 201 and the at least one second light source 202 providing the first and second incident light, and the circuit board 203 carrying the light sources are shown in hatching lines.

Figure 1:
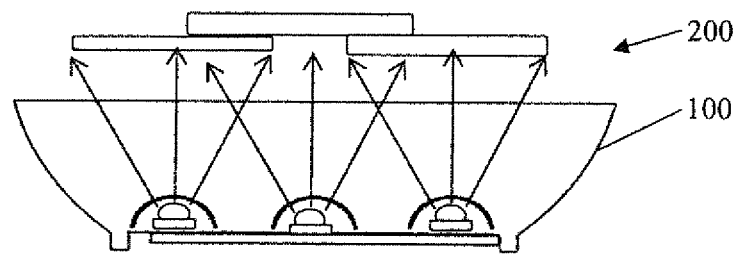
FIG. 1 is a sectional view of an illumination device according to an embodiment in the related art.

Different from the embodiment in the prior art shown in FIG. 1, the first incident surface 4 and the second incident surface 5 shown in FIG. 2 are different curved surfaces, in this way, the optical paths of the first and second incident light can be adjusted, and thereby, the incident light having different colors can be mixed as sufficiently as possible in the lens after the primary refraction via the first incident surface 4 and the second incident surface 5, such that the emergent light emitted from the top surface 2 has ideal color and uniform light distribution, for example, can form round light spots. In the embodiment shown in FIG. 2, one first accommodation cavity R1 is in the center of the bottom wall 1, and the inner wall of the first accommodation cavity R1 is a symmetrical curved surface, such that it serves as the first incident surface 4 for receiving the first incident light from the first light source 201; and two second accommodation cavities R2 are symmetrically arranged on the two sides of the first accommodation cavity R1, and their inner walls are both configured as an asymmetrical curved surface, such that they serve as the second incident surfaces 5 for receiving the second incident light from the second light source 202. In addition, in order to further ensure superior light mixing effect and uniformity of light distribution, the top wall 2 is an emergent surface consisting of a micro-lens array. The first and second incident light is refracted for two times by the bottom wall 1 and the top wall 2 of the lens 100, which can ensure superior light mixing effect, and uniform light distribution on the object to be illuminated.

In the embodiment shown in the figure, the first incident light uniformly emits towards the top wall 2 of the lens 100 through, for example, the first incident surface 4 configured as a spherical surface. The vertex of the second incident surface 5 is, in a cross section, located on a side, away from the first incident surface 4, of a midline of a projection of the second incident surface 5 on a horizontal plane, that is, the angle between the second incident surface 5 and the horizontal plane is smaller on the side towards the first incident surface 4, and is greater on the side away from the first incident surface 4. The second incident light on the two sides is refracted by the second incident surface 4, and the refracted optical path deflects towards the optical axis of the first incident light in the center, and the first incident light and the second incident light are mixed sufficiently. The different designs of the first and second incident surfaces 4, 5 lay a good foundation for the fine adjustment of the color of different light obtained after the multi-color incident light is mixed in the lens 100, and by adjusting the optical paths of the first and second incident light in the lens, the light efficiency is further improved.

In an embodiment which is not shown, there can be only one first accommodation cavity R1 and one second accommodation cavity R2 on the bottom wall 1.

In another embodiment which is not shown, there can be a plurality of second accommodation cavities R2, for example, three or more, on the bottom wall 1. These second accommodation cavities R2 are arranged to uniformly surround the first accommodation cavity R1 in a circumferential direction.

In another embodiment which is not shown, when there are a plurality of first accommodation cavities R1 and a plurality of second accommodation cavities R2 on the bottom wall 1, the plurality of first accommodation cavities R1 are concentratively arranged in the center of the bottom wall 1, and the second accommodation cavities R2 are arranged to uniformly surround the first accommodation cavities R1 in a circumferential direction. In this case, the more concentrative the first and second accommodation cavities R1, R2 are arranged, the better the light mixing effect is.

Figure 3:
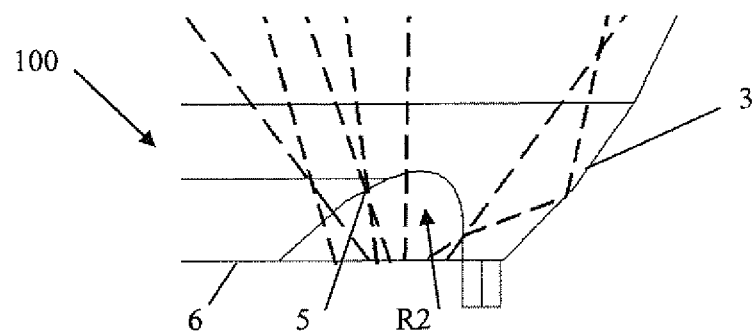
FIG. 3 is a first detailed view of the embodiment in FIG. 2.

FIG. 3 is a first detailed view of the embodiment in FIG. 2, which clearly shows the second incident surface 5 and the circumferential wall 3 of the lens 100, and the optical path of the second incident light in the lens 100. In the present embodiment, the second incident surface 5 can be configured as a free curved surface, and particularly preferably, the second incident surface 5 has, in a cross section, a curve profile defined by the formula:

$$y=-1E-08x^6+2E-06x^5-0.0001x^4+0.0032x^3-0.0633x^2+1.4584x+1E-06.$$

Similar to the second incident surface 5, the circumferential wall 3 configured as a total internal reflection surface can further be a free curved surface defined by, for example, a higher-order equation, so as to carry out total internal reflection which is beneficial to light mixing. In the present embodiment, the circumferential wall 3 can reflect the second incident light refracted by the second incident surface 5, so as to make fine adjustment to the optical path thereof, which is beneficial to sufficient light mixing.

Figure 4:
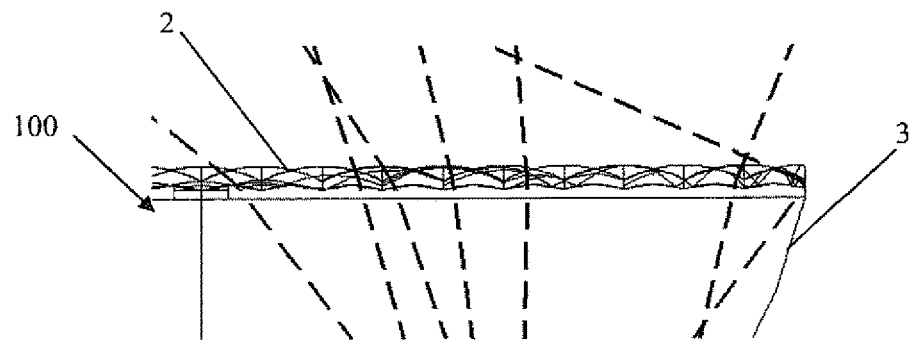
FIG. 4 is a second detailed view of the embodiment in FIG. 2.

FIG. 4 is a second detailed view of the embodiment in FIG. 2, which clearly shows the top wall 2 of the lens 100 and the optical path going through the top wall 2. The top wall 2 serving as the emergent surface is configured as a micro-lens array, and in this way, a further fine adjustment and mixing can be made to the light that has been finely adjusted and mixed in the lens 100, wherein the light includes light directly emitting towards the top wall 2 through the first and second incident surfaces 4, 5, and a small amount of light reflected by the circumferential wall 3. Thus, the lens 100 provides the way for multi-times of light mixing for the first and second incident light having different colors.

Figure 5:
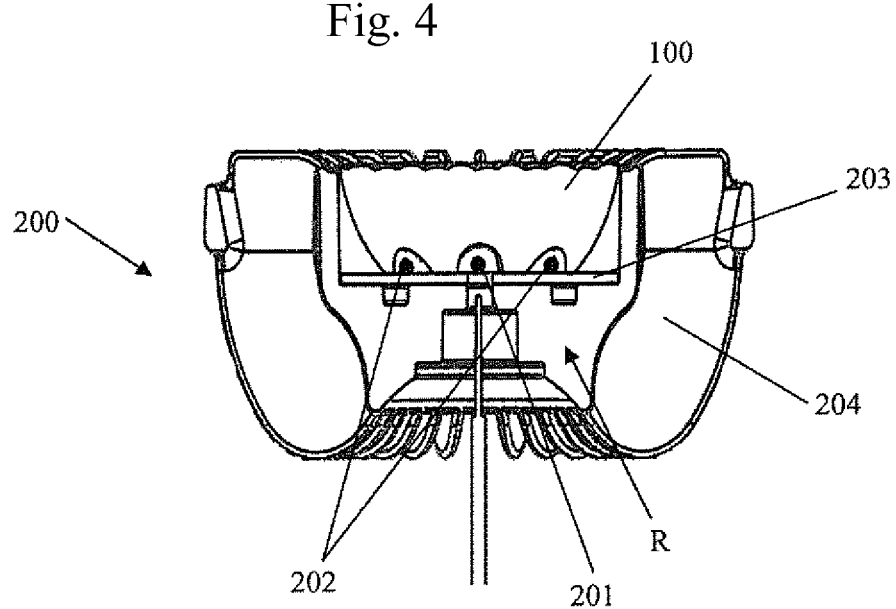
FIG. 5 is a sectional view of an illumination device according to an embodiment of the present disclosure.

FIG. 5 is a sectional view of an illumination device according to an embodiment of the present disclosure. The illumination device 200 with adjustable color temperature includes at least one first light source 201, at least one second light source 202, and the lens 100 as shown in FIG. 2. The at least one first light source 201 and the at least one second light source 202 are fixed on the circuit board 203, and are respectively arranged in the first accommodation cavity R1 and the second accommodation cavity R2 of the lens 100. The illumination device 200 further includes a heat sink 204, and the lens 100 and the circuit board 203 can be integratedly arranged in an accommodation portion R of the heat sink, so as to minimize the structural space of the illumination device 200. It is feasible to preferably configure the heat sink 204 as a circular structure having heat dissipating ribs on a circumferential wall, and the accommodation portion R is located in the center of the heat sink 204. The heat sink 204 can further have other suitable structures. In this way, the heat sink can be in thermal conduct with the heat generating member on the circuit board in a large area, so as to improve the cooling effect of the illumination device 200. In the present embodiment, the first and second light sources 201, 202 can be LED chips, and in this case, the illumination device 200 can be designed as a retrofit lamp.

The circuit board 203 includes control circuits controlling a working state of the first and second light sources 201, 202, respectively. The person skilled in the art can design the control circuit based on the principle of switching circuit or PWM circuit. The on and off of the first and second light sources are controlled through the control circuit, and the intensity of the driving currents thereof is preferably controlled, which thereby can change the colors of the first and second light sources and achieve light adjusting and light mixing.

For example, when the first light source 201 emits warm white light having a color temperature of 2700K, and the second light source 202 emit cool white light having a color temperature of 6500K, the illumination device 200 in the present embodiment can emit mixed natural white light having a color temperature of 4000K, and the light sources 201, 202 can be respectively controlled such that the illumination device 200 emits, for example, warm white light of 2700K, or cool white light of 6500K. Thus, the color temperature of the white light emitted from the illumination device 200 in the present embodiment is adjustable in the range of 2700-6500K. The illumination device 200 shown in FIG. 5 and other illumination devices 200 according to the present disclosure are applicable to, for example, AR111 type lamp (LED) or MR16 type lamp (LED).

When the first and second light sources 201, 202 are monochromatic light sources, the embodiment shown in FIG. 5 is further applicable.

The above is merely preferred embodiments of the present disclosure but not to limit the present disclosure. For the person skilled in the art, the present disclosure may have various alterations and changes. Any alterations, equivalent substitutions, improvements, within the spirit and principle of the present disclosure, should be covered in the protection scope of the present disclosure.

LIST OF REFERENCE SIGNS 1 bottom wall
2 top wall
3 circumferential wall
4 first incident surface
5 second incident surface
6 connecting surface
100 lens
200 illumination device
201 first light source
202 second light source
203 circuit board
204 heat sink
R accommodation portion
R1 first accommodation cavity
R2 second accommodation cavity

The invention claimed is:

1. A lens for an illumination device, the lens comprising:
a bottom wall,
a top wall, and
a circumferential wall, the circumferential wall connecting the bottom wall and the top wall,
   wherein a plurality of regions of the bottom wall respectively arch towards the top wall to define at least one first accommodation cavity having an inner wall configured as a first incident surface, and at least one second accommodation cavity having an inner wall configured as a second incident surface, the first incident surface and the second incident surface being configured as different curved surfaces for receiving first incident light and second incident light, respectively,
   wherein the second incident surface is a non-rotationally symmetrical curved surface with respect to a line between a vertex of the second incident surface and a midpoint between both end points of a projection of the second incident surface on the bottom wall, the vertex of the second incident surface in a cross section, being located on a side, away from the first incident surface, of a midline of a projection of the second incident surface on a horizontal plane, and
   wherein the second incident surface has, in a cross section, a curve profile defined by the formula: $y=-1E-08x^6+2E-06x^5-0.0001x^4+0.0032x^3-0.0633x^2+1.4584x+1E-06$.

2. The lens according to claim 1,
wherein the first incident surface is a symmetrical curved surface, and the second incident surface is an asymmetrical curved surface.

3. The lens according to claim 2,
wherein the first incident surface is a rotationally symmetrical curved surface.

4. The lens according to claim 3,
wherein the first incident surface is a spherical surface.

5. The lens according to claim 1,
wherein the top wall is configured as an emergent surface consisting of a micro-lens array.

6. The lens according to claim 1,
wherein the accommodation cavities are arranged to be separated from each other.

7. The lens according to claim 1,
wherein the circumferential wall is configured as a total internal reflection surface having a curved surface profile.

8. The lens according to claim 1,
wherein the number of the second accommodation cavity is more than one, and the second accommodation cavities are uniformly arranged around the first accommodation cavity.

9. An illumination device comprising:
at least one first light source,
at least one second light source, and
a lens,
   the lens comprising:
   a bottom wall,
   a top wall, and
   a circumferential wall, the circumferential wall connecting the bottom wall and the top wall,
   wherein a plurality of regions of the bottom wall respectively arch towards the top wall to define at least one first accommodation cavity having an inner wall configured as a first incident surface, and at least one second accommodation cavity having an inner wall configured as a second incident surface, the first incident surface and the second incident surface being configured as different curved surfaces for receiving first incident light and second incident light, respectively,
   wherein the second incident surface is a non-rotationally symmetrical curved surface with respect to a line between a vertex of the second incident surface and a midpoint between both end points of a projection of the second incident surface on the bottom wall, the vertex of the second incident surface, in a cross section, being located on a side, away from the first incident surface, of a midline of a projection of the second incident surface on a horizontal plane, and
   wherein the second incident surface has, in a cross section, a curve profile defined by the formula:
   $y=-1E-08x^6+2E-06x^5-0.0001x^4+0.0032x^3-0.0633x^2+1.4584x+1E-06$.

10. The illumination device according to claim 9,
wherein light emitted from the at least one first light source and light emitted from the at least one second light source have different color temperatures.

11. The illumination device according to claim 9, further comprising:
a circuit board carrying the first and second light sources, and
a heat sink,
wherein the first light source is accommodated in the first accommodation cavity of the lens, and the second light source is accommodated in the second accommodation cavity of the lens.

12. The illumination device according to claim 11,
wherein the heat sink comprises an accommodation portion accommodating the lens and the circuit board.

13. The illumination device according to claim 11,
wherein the heat sink is configured as a circular structure having heat dissipating ribs on a circumferential wall, and the accommodation portion is arranged in the center of the heat sink.

14. The illumination device according to claim 11,
wherein the circuit board comprises control circuits controlling a working state of the first and second light sources, respectively.

* * * * *